R. S. SMITH.
ELECTRICALLY HEATED STEERING RIM.
APPLICATION FILED MAR. 14, 1913.
1,125,889.　　　　　　　　　　　Patented Jan. 19, 1915.
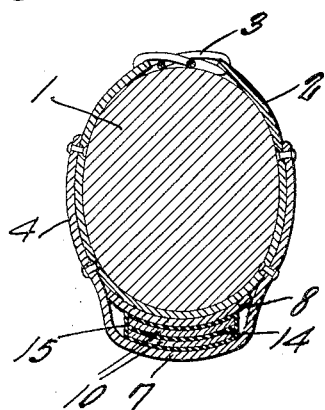
Fig. 1.
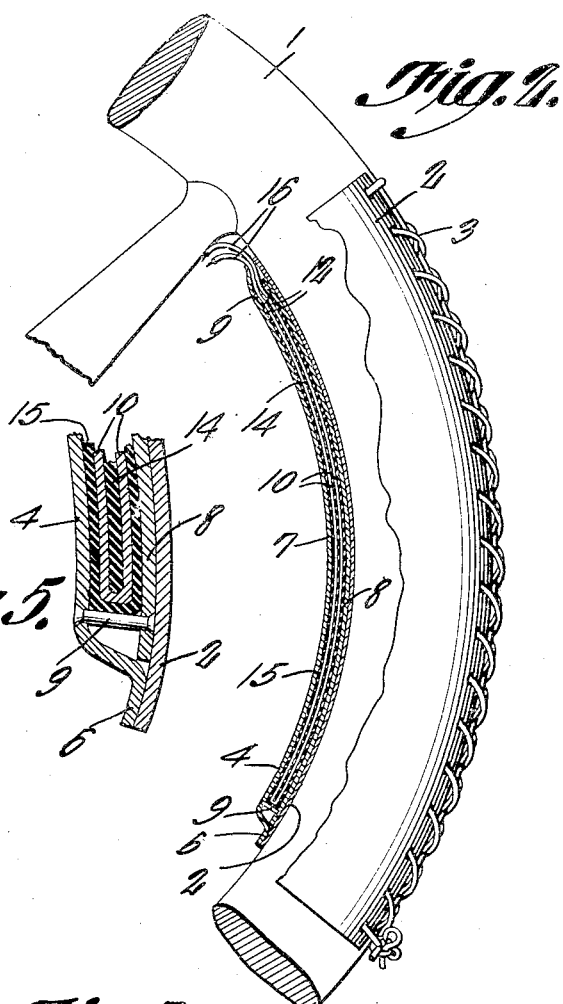
Fig. 2.
Fig. 5.
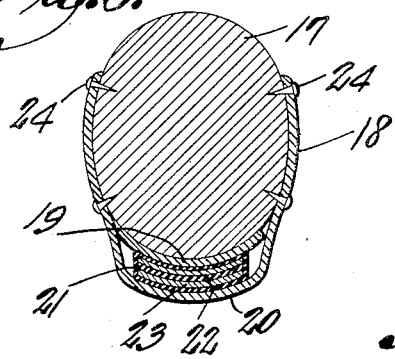
Fig. 6.
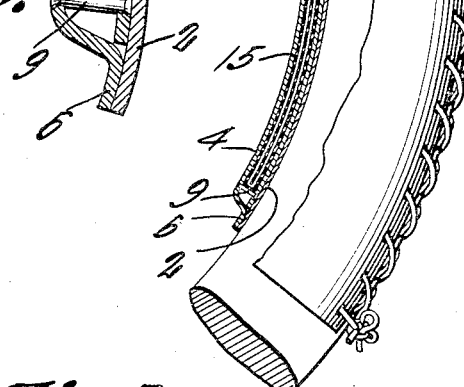
Fig. 3.
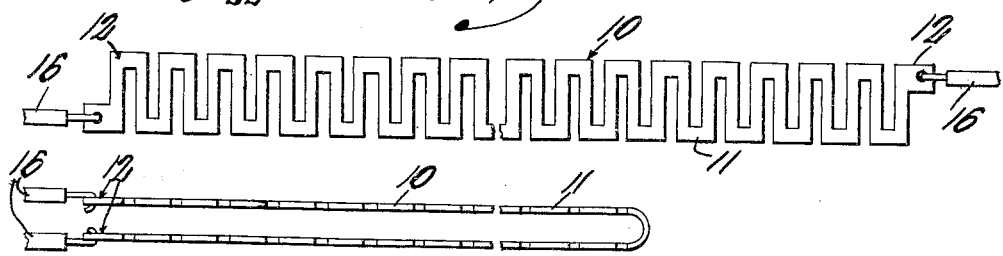
Fig. 4.
Witnesses
Reuben S. Smith
Inventor
by C. A. Snow & Co.
Attorneys

UNITED STATES PATENT OFFICE.

REUBEN S. SMITH, OF KANSAS CITY, MISSOURI.

ELECTRICALLY-HEATED STEERING-RIM.

1,125,889.

Specification of Letters Patent. Patented Jan. 19, 1915.

Application filed March 14, 1913. Serial No. 754,321.

*To all whom it may concern:*

Be it known that I, REUBEN S. SMITH, a citizen of the United States, residing at Kansas City, in the county of Jackson and State of Missouri, have invented a new and useful Electrically - Heated Steering - Rim, of which the following is a specification.

The device forming the subject matter of this application is adapted to be applied to the steering wheel of a motor propelled vehicle, of a boat or the like, for the purpose of warming the rim of the wheel.

One object of the present invention is to provide novel means for assembling the heating element with the rim.

Another object of the invention is to provide novel means for holding the heating element in place in the casing.

It is within the scope of the invention to improve generally and to enhance the utility of, devices of that type to which the present invention appertains.

With the above and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawing: Figure 1 shows the invention in transverse section; Fig. 2 is a longitudinal section wherein sundry parts appear in elevation; Fig. 3 is a plan of the blank from which the heating element is formed; Fig. 4 is an elevation showing the blank of Fig. 3 folded upon itself and in the position which it will assume when assembled with the steering wheel; Fig. 5 is a fragmental longitudinal section showing, upon an enlarged scale, a portion of the structure depicted in Fig. 2; and Fig. 6 is a transverse section showing a modified form of the invention.

In the drawings, the numeral 1 indicates the rim of steering wheel. The heating element may be assembled with the rim 1 in any desired manner, but, assuming that it is not desired to mar the rim 1, the rim is surrounded by a flexible covering 2 which may be fashioned from leather, canvas or the like. The longitudinal edges of the covering 2 may be connected by any suitable means, but in the present instance, these edges of the covering 2 are connected by a lacing cord 3.

A trough shaped casing 4 partially surrounds the covering 2 and is held thereon by rivets or like means, adapted to a like end. The ends 6 of the casing 4 bear against the covering 2 and the casing is provided with a longitudinally extended rib 7 which is closed by a plate 8 held in place by securing elements 9, the securing elements 9 being connected with the casing 4.

In the compartment formed by the closure plate 8 and the rib 7 of the casing 4 is located a heating element 10. The heating element 10 may be of any desired form, but in the present instance is fashioned from a blank of thin resistance material, such as German silver or the like, the blank being stamped, cut or otherwise manipulated to form a plurality of oppositely extended transverse loops 11. The blank is then folded upon itself, adjacent its transverse center, so that the blank assumes a U-shape as shown in Fig. 4, the ends 12 of the blank being brought into close relation. A sheet of insulating material, indicated as 14, which may be mica, is inserted between the arms of the U-shaped heating element, and the heating element together with the sheet 14 is inserted into a tube 15 which may be fashioned from mica, although any other insulating material may be employed. The tube 15 with the sheet 14 and the heating element 10 therein is mounted in the depressed rib 7 of the casing 4 and is held in place by the closure plate 8 and the securing elements 9. From the ends of the heating element 10 extend insulated conductors 16 which may be connected with a source of electrical energy.

Obviously, when a current is passed through the heating element 10 by means of the conductors 16, the temperature of the heating element will be raised, owing to its high resistance, the casing 4 being heated accordingly.

In Fig. 6 a modified form of the invention is shown. Referring to Fig. 6, the rim is denoted by the numeral 17, and the casing by the numeral 18. The closure is indicated at 19 and the casing, as above described, is provided with a depressed rib 20 receiving the tube 21, the intermediate sheet 22 and the heating element 23. In the form of invention under discussion, the flexible covering 2 is dispensed with, the casing 18 being connected directly to the rim 17 by means of securing elements 24.

The device herein disclosed may be fashioned at a trifling expense and may be assembled with the rim of a steering wheel readily and, if desired, without mutilating the rim in any way.

As clearly shown in Fig. 5, the securing elements 9 exercise a double function in that they constitute, at once, a means for holding the closure plate 8 in place and means for preventing longitudinal movement of the insulating tube 15.

The connecting means represented by the lacing cord 3 projects beyond the outer face of the tube and serves to prevent the hand of the operator from slipping on the tube, although the latter is not gripped tightly. If the tube is not gripped tightly, the blood in the hand of the operator, when warmed by the heating element 10, will circulate freely, and the hand will warm uniformly and will be kept in that condition, it being common and well known that hand heating devices of all sorts are of but limited utility if the hand is gripped tightly and firmly about an object.

Having thus described the invention, what is claimed is:—

1. A heater for steering wheel rims, comprising a strip of flexible material having its edges disposed adjacent each other to form a rim inclosing tube; a flexible heating element secured to the strip longitudinally thereof; and a connecting means uniting the edges of the strip and substantially coextensive in length with the strip, the connecting means projecting beyond the outer face of the tube to afford a roughened, hand-engaging surface, rendering unnecessary, a tight grip upon the tube.

2. As a new article of manufacture, a heating attachment for steering wheels, comprising a flexible ring-shaped tubular member having sides with eyelets, two insulating members, a resistance wire disposed between the insulating members, and means for securing the insulating members together and to the flexible member.

3. As a new article of manufacture, a heating attachment for steering wheels, comprising a flexible body formed of strips of insulating material, a resistance wire disposed back and forth transversely between the strips and a cover on the outer resistance strip, the whole being adapted to be bent into ring shape to fit upon a wheel and provided at its edges with means whereby it may be secured to the wheel.

In testimony that I claim the foregoing as my own, I have hereto affixed my signature in the presence of two witnesses.

REUBEN S. SMITH.

Witnesses:
V. Z. RAINS,
W. T. COCK.